US011221476B2

(12) United States Patent
Betzig et al.

(10) Patent No.: US 11,221,476 B2
(45) Date of Patent: Jan. 11, 2022

(54) HIGH-RESOLUTION, REAL-TIME IMAGING WITH ADAPTIVE OPTICS AND LATTICE LIGHT SHEETS

(71) Applicant: Howard Hughes Medical Institute, Ashburn, VA (US)

(72) Inventors: Robert Eric Betzig, Berkeley, CA (US); Tsung-Li Liu, San Diego, CA (US); Daniel E. Milkie, Ashburn, VA (US); Kai Wang, Ashburn, VA (US); Wesley Legant, Fairfax, VA (US)

(73) Assignee: Howard Hughes Medical Institute, Ashburn, VA (US)

( * ) Notice: Subject to any disclaimer, the term of this patent is extended or adjusted under 35 U.S.C. 154(b) by 0 days.

(21) Appl. No.: 16/159,579

(22) Filed: Oct. 12, 2018

(65) Prior Publication Data

US 2019/0113731 A1    Apr. 18, 2019

Related U.S. Application Data

(60) Provisional application No. 62/571,271, filed on Oct. 12, 2017.

(51) Int. Cl.
*G02B 21/36* (2006.01)
*G02B 21/00* (2006.01)
(Continued)

(52) U.S. Cl.
CPC .......... *G02B 21/361* (2013.01); *G01N 21/64* (2013.01); *G01N 21/6428* (2013.01);
(Continued)

(58) Field of Classification Search
CPC .............. G02B 21/361; G02B 21/0032; G02B 21/0072; G02B 27/58; G02B 21/0076;
(Continued)

(56) References Cited

U.S. PATENT DOCUMENTS 9,500,846 B2 * 11/2016 Betzig ................ G01N 21/6458
10,509,217 B2 * 12/2019 Betzig .................. G02B 21/361
(Continued)

OTHER PUBLICATIONS

International Search Report and Written Opinion for International Application No. PCT/US2018/055740, dated Apr. 3, 2019, 21 pages.
(Continued)

*Primary Examiner* — Mohamed K Amara
(74) *Attorney, Agent, or Firm* — Brake Hughes Bellermann LLP

(57) ABSTRACT

A microscope directs light through an excitation objective to generate a lattice light sheet (LLS) within a sample. A detection objective collects signal light from the sample in response to the LLS and images the collected light onto a detector. Second and third light beams are imaged onto focal planes of the excitation objective and detection objective, respectively. One or more wavefront detectors determine wavefronts of light emitted from the sample and through the excitation objective in response to the imaged second light beam and emitted from the sample through the detection objective in response to the imaged third light beam. A wavefront of the first light beam is modified to reduce a sample-induced aberration of the LLS within the sample, and a wavefront of the signal light emitted from the sample is modified to reduce a sample-induced aberration of the signal light at the detector.

40 Claims, 5 Drawing Sheets

(51) Int. Cl.
| | |
|---|---|
| G02B 27/58 | (2006.01) |
| G01N 21/64 | (2006.01) |
| G02B 21/06 | (2006.01) |
| G02B 26/06 | (2006.01) |
| G02B 27/00 | (2006.01) |

(52) U.S. Cl.
CPC ..... *G01N 21/6458* (2013.01); *G02B 21/0032* (2013.01); *G02B 21/0072* (2013.01); *G02B 21/0076* (2013.01); *G02B 21/06* (2013.01); *G02B 21/367* (2013.01); *G02B 26/06* (2013.01); *G02B 27/0025* (2013.01); *G02B 27/58* (2013.01); *G02B 2207/114* (2013.01)

(58) Field of Classification Search
CPC ...... G02B 21/367; G02B 21/06; G02B 26/06; G02B 27/0025; G02B 2207/114; G01N 21/64; G01N 21/6428; G01N 21/6458
See application file for complete search history.

(56) References Cited

U.S. PATENT DOCUMENTS

| | | | | |
|---|---|---|---|---|
| 10,721,441 | B2* | 7/2020 | Betzig | G02B 21/002 |
| 10,841,506 | B2* | 11/2020 | Liedtke | G02B 21/0032 |
| 2011/0300490 | A1* | 12/2011 | Rachet | G03F 7/70191 |
| | | | | 430/322 |
| 2015/0022881 | A1* | 1/2015 | Loza Alvarez | G02B 21/0076 |
| | | | | 359/385 |
| 2015/0160450 | A1* | 6/2015 | Ou | G02B 21/367 |
| | | | | 348/80 |
| 2015/0362713 | A1* | 12/2015 | Betzig | G02B 21/0076 |
| | | | | 250/459.1 |
| 2016/0003740 | A1* | 1/2016 | Tao | G01N 21/6458 |
| | | | | 250/459.1 |
| 2017/0181625 | A1* | 6/2017 | Kawakami | A61B 3/0041 |
| 2017/0242281 | A1* | 8/2017 | Leger | G02B 21/06 |
| 2017/0343784 | A1* | 11/2017 | Wu | G01J 3/2823 |
| 2018/0024063 | A1* | 1/2018 | Egner | G02B 21/00 |
| | | | | 359/386 |
| 2019/0212535 | A1* | 7/2019 | Knebel | G02B 21/367 |
| 2019/0219811 | A1* | 7/2019 | Keller | G02B 21/06 |
| 2020/0249168 | A1* | 8/2020 | Voleti | G02B 21/0072 |

OTHER PUBLICATIONS

Invitation to Pay Additional Fees for International Application No. PCT/US2018/055740, dated Feb. 8, 2019, 17 pages.
Chen, et al., "Lattice light sheet microscopy: imaging molecules to embryos at high spatiotemporal resolution", sciencemag.org, vol. 346, Issue 6208, Oct. 24, 2014, 13 pages.
Wang, et al., "Rapid adaptive optical recovery of optimal resolution over large volumes", Nature Methods 11, Jun. 2014, pp. 625-628.
Ahrens, et al., "Whole-brain functional imaging at cellular resolution using light-sheet microscopy", Nature Methods 10, 2013, 20 pages.
Cha, et al., "Phototoxicity in live fluorescence microscopy, and howto avoid it", BioEssays, vol. 39, Issue 8, 1700003, Aug. 2017, 15 pages.
Laissue, et al., "Assessing phototoxicity in live fluorescence imaging", Nature Methods, vol. 14, No. 7, Jul. 2017, pp. 357-661.
Pampaloni, et al., "The third dimension bridges the gap between cell culture and live tissue", Nat. Rev. Mol. Cell Biol. 8, 2007, pp. 839-845.
Pittet, et al., "Intravital imaging", Cell, vol. 147, Issue 5, Nov. 2011, pp. 983-991.
Neigert, et al., "Intravital microscopy: A novel tool to study cell biology in living animals", Histochem Cell Biol., vol. 133, No. 5, May 2010, pp. 481-491.
Ji, "Adaptive optical fluorescence microscopy", Nat. Methods, vol. 14, No. 4, Apr. 2017, pp. 374-380.
Wilding, et al., "Adaptive illumination based on direct wavefront sensing in a light-sheet fluorescence microscope", Opt. Express, vol. 24, No. 22, 2016, p. 24896-24906.
Bourgenot, et al., "3D adaptive optics in a light sheet microscope", Opt. Express, vol. 20, Issue 12, Jun. 2012, p. 13252-13261.
Aviles-Espinosa, et al., "Measurement and correction of in vivo sample aberrations employing a nonlinear guide-star in two-photon excited fluorescence microscopy", Biomed. Opt. Express, vol. 2, Issue 11, Nov. 2011, pp. 3135-3149.
Royer, et al., "Adaptive light-sheet microscopy for long-term, high-resolution imaging in living organisms", Nat. Biotechnol. 34, 2016, 15 pages.
Arbizzani, et al., "Novel transgenic lines to fluorescently label clathrin and caveolin endosomes in live zebrafish", Zebrafish, vol. 12, No. 2, 2015, pp. 202-203.
Ehrlich, et al., "Endocytosis by random initiation and stabilization of clathrin-coated pits", Cell, vol. 118, Sep. 2004, pp. 591-605.
Li, et al., "Extended-resolution structured illumination imaging of endocytic and cytoskeletal dynamics", Science, vol. 349, Issue 6251, Aug. 2015, pages aab3500-1-aab3500-10.
Kurai, et al., "Dynamics of intracellular clathrin/AP1- and clathrin/AP3-containing carriers", Cell Rep., vol. 2, Issue 5, Movember2012, pp. 1111-1119.
Vassilopoulos, et al., "Actin scaffolding by clathrin heavy chain is required for skeletal muscle sarcomere organization", J. Cell Biol. 205(3), May 2014, pp. 377-393.
Aguet, et al., "Membrane dynamics of dividing cells imaged by lattice light-sheet microscopy", Mol. Biol. Cell 27, Movember2016, pp. 3418-3435.
Kadlecova, et al., "Regulation of clathrin-mediated endocytosis by hierarchical allosteric activation of AP2", J. Cell Biol. 216(1), 2017, pp. 167-179.
Lu, et al., "Cisternal organization of the endoplasmic reticulum during mitosis", Mol. Biol. Cell 20(15), Aug. 2009, pp. 3471-3480.
Boucrot, et al., "Endosomal recycling controls plasma membrane area during mitosis", Proc. Natl. Acad. Sci., vol. 104, Mo 19, May 2007, pp. 7939-7944.
Cha, et al., "Independent modes of ganglion cell translocation ensure correct lamination of the zebrafish retina", J. Cell Biol. 215(2), 2016, pp. 259-275.
Sidhaye, et al., "Concerted action of neuroepithelial basal shrinkage and active epithelial migration ensures efficient optic cup morphogenesis", eLife 6, 2017, 29 pages.
Cha, et al., "Using light sheet fluorescence microscopy to image zebrafish eye development", J. Vis. Exp. 110, Apr. 2016, 21 pages.
Sauer, "Mitosis in the neural tube", J. Comp. Neurol. 62, Oct. 1935, pp. 377-405.
Strzyz, et al., "Interkinetic nuclear migration is centrosome independent and ensures apical cell division to maintain tissue integrity", Developmental Cell, vol. 32, Issue 2, Jan. 2015, pp. 203-219.
Lowery, et al., "The trip of the tip: Understanding the growth cone machinery", Nat. Rev. Mol. Cell Biol., 10, May 2009, op. 332-343.
Zheng, et al., "Essential role of filopodia in chemotropic turning of nerve growth cone induced by a glutamate gradient", J. Neurosci. 16(3), Feb. 1996, pp. 1140-1149.
Cai, et al., "Improved tools for the Brainbow toolbox", Nat. Methods 10(6), May 2013, pp. 540-547.
Kinkhabwala, et al., "A structural and functional ground plan for neurons in the hindbrain of zebrafish", PNAS, vol. 108, No. 3, Jan. 2011, pp. 1164-1169.
Dliveira, et al., "Neutrophil migration in infection and wound repair: Going forward in reverse", Nat. Rev. Immunol. 16(6) May 2016, pp. 378-391.
Marki, et al., "Rolling neutrophils form tethers and slings under physiologic conditions in vivo", J. Leukoc. Biol. 103, 2017, pp. 67-70.
Stoletov, et al., "Visualizing extravasation dynamics of metastatic tumor cells", J. Cell Sci. 123, Jul. 2010, pp. 2332-2341.
Tomer, et al., "Quantitative highspeed imaging of entire developing embryos with simultaneous multiview light-sheet microscopy", Nat. Methods 9(7), Jun. 2012, pp. 755-763.

(56) References Cited

OTHER PUBLICATIONS

Chhetri, et al., "Whole-animal functional and developmental imaging with isotropic spatial resolution", Nat. Methods 12, Oct. 2015, 12 pages.
Kumar, et al., "Dual-view plane illumination microscopy for rapid and spatially isotropic imaging", Nat. Protoc. 9(11), 2014, pp. 2555-2573.
Swoger, et al., "Multiview image fusion improves resolution in three-dimensional microscopy", Opt. Express, vol. 15, Bsue 13, Jun. 2007, pp. 8029-8042.
Simmonds, et al., "Modelling of multi-conjugate adaptive optics for spatially variant aberrations in microscopy", J. Opt., vol. 15, 094010, Sep. 2013, 9 pages.
Swinburne, et al., "Improved long-term imaging of embryos with genetically encoded a-bungarotoxin", Plos One 10, 20134005, Aug. 2015, 15 pages.

* cited by examiner

HIGH-RESOLUTION, REAL-TIME IMAGING WITH ADAPTIVE OPTICS AND LATTICE LIGHT SHEETS

CROSS-REFERENCE TO RELATED APPLICATIONS

This application is a non-provisional of, and claims priority under 35 U.S.C. § 119 to, U.S. Provisional Patent Application No. 62/571,271, filed Oct. 12, 2017, entitled "High-Resolution, Real-Time Imaging With Adaptive Optics and Lattice Light Sheets," the disclosure of which is incorporated herein in its entirety.

BACKGROUND

True physiological imaging of subcellular dynamics requires studying cells within their parent organisms, where all the environmental cues that drive gene expression, and hence the phenotypes we actually observe, are present. A complete understanding also requires volumetric imaging of the cell and its surroundings at high spatiotemporal resolution without inducing undue stress on either.

A common tenet, oft repeated in the field of bioimaging, is "seeing is believing". But when can we believe what we see? The question becomes particularly relevant when imaging subcellular dynamics by fluorescence microscopy. After all, as powerful as genetically encoded fluorescent proteins have become, until recently they have rarely been used at endogenous expression levels, and therefore can upset the homeostatic balance of the cell. Furthermore, traditional imaging tools such as confocal microscopy are often too slow to study fast three-dimensional (3D) processes across cellular volumes, create out-of-focus photo-induced damage and fluorescence photobleaching, and subject the cell at the point of measurement (i.e., the excitation focus) to peak intensities orders of magnitude beyond that under which life evolved. Finally, much of what fluorescence microscopy has taught us about cellular processes has come from observing isolated adherent cells on glass, and yet it is certain that they did not evolve there.

Thus, true physiological imaging requires studying cells within the organism in which they evolved, where all the environmental cues that regulate cell physiology are present.

SUMMARY

In a first general aspect, a microscope for imaging a sample includes a first light source for generating a first light beam and first beam-forming optics configured for receiving the first light beam and generating a lattice light sheet (LLS) within the sample. The beam-forming optics including an excitation objective having an axis oriented in a first direction. The microscope further includes a detector configured for detecting signal light emitted from the sample in response to the LLS in the sample, second beam-forming optics that include a detection objective oriented in a direction substantially perpendicular to the first direction and configured for collecting signal light emitted from the sample in response to the LLS within the sample and for imaging the collected light onto the detector. The microscope further includes third beam-forming optics configured for receiving a second light beam and imaging the light beam onto a focal plane of the excitation objective and fourth beam-forming optics configured for receiving a third light beam and imaging the light beam onto a focal plane of the detection objective. The microscope further includes one or more wavefront detectors configured for determining a wavefront of light emitted from the sample and through the excitation objective in response to the second light beam being imaged by the third beam-forming optics onto the focal plane of the excitation objective and configured for determining a wavefront of light emitted from the sample and through the detection objective in response to the third light beam being imaged by the fourth beam-forming optics onto the focal plane of the detection objective. The first beam-forming optics include a first wavefront modulating element configured for modifying a wavefront of the first light beam from which the LLS is generated to reduce a sample-induced aberration of the LLS within the sample, and the second beam-forming optics include a second wavefront modulating element configured for modifying a wavefront of the signal light emitted in response to the LLS in the sample to reduce a sample-induced aberration of the signal light at the detector.

Implementations can include one or more of the following features, alone or in any combination with each other.

For example, the LLS can have a thickness of less than about one micron.

A wavelength of light emitted from the sample and through the excitation objective in response to the light beam being imaged by the third beam-forming optics onto the focal plane of the excitation objective can be half the wavelength of the light beam imaged by the third beam-forming optics onto the focal plane of the excitation objective.

A wavelength of light emitted from the sample and through the detection objective in response to the light beam being imaged by the fourth beam-forming optics onto the focal plane of the detection objective can be half the wavelength of the light beam imaged by the fourth beam-forming optics onto the focal plane of the detection objective.

The first wavefront modulating element can include a spatial light modulator (SLM), and the SLM can be conjugate to the sample. The first beam-forming optics can include the SLM. The second wavefront modulating element can include a deformable mirror (DM).

The first wavefront modulating element can be configured for applying discrete different wavefront modifications to the first light beam from which the LLS is generated when the LLS is located at different positions within the sample. A distance between different positions of the LLS over which a wavefront modification to the first light beam remains constant before a different discrete wavefront modification is applied is determined based on a variation of a refractive index within the sample.

The sample can include guide star emitters that emit light having a different wavelength than the signal light.

The microscope can further include one or more processors configured for determining a displacement of the LLS from a focal plane of the detection objection along a direction perpendicular to the focal plane based on light emitted from the sample in response to the LLS and collected through the excitation objective and based on light emitted in response to the light beam imaged onto the focal plane of the detection objective by the fourth beam-forming optics and collected through the excitation objective.

The first and second beam forming optics can be configured for adjusting, based on the determination of the displacement, a location of a plane of the LLS to within 400 nm of the focal plane of the detection objective.

The first beam-forming optics can be configured for positioning the LLS at different positions within the sample to image different tiles of the sample and the microscope can additionally include a processor for generating an image of the sample based on the different tile images, where the first wavefront modulating element is configured for applying different wavefront modifications of the first light beam from which the LLS is generated for the different tiles, and where the second wavefront modulating element is configured for applying different wavefront modifications of the emitted signal light for the different tiles. An initial wavefront modification applied by the first wavefront modulating element for a second tile adjacent to a first tile can be based on a wavefront modification applied by the first wavefront modulating element to the first tile, and an initial wavefront modification applied by the second wavefront modulating element for the second tile adjacent to the first tile can be based on a wavefront modification applied by the second wavefront modulating element to the first tile.

A wavefront modification for a tile applied by the first wavefront modulating element can updated from a first modification at a first time to a second modification at a second time later than the first time, and a wavefront modification for the tile applied by the second wavefront modulating element can updated from a first modification at the first time to a second modification at a third time later than the first time.

Wavefront modifications applied by the first wavefront modulating element for respective tiles of a first subset of the tiles can be updated during a first time interval, with at least some of the tiles in the first subset being non-contiguous with another tile of the first subset, and wavefront modifications applied by the first wavefront modulating element for respective tiles of a second subset of the tiles can be updated during a second time interval that occurs after the first time interval, at least some of the tiles in the second subset being non-contiguous with another tile of the second subset, where wavefront modifications applied by the second wavefront modulating element for the respective tiles of the first subset of the tiles are updated during the first time interval, and where wavefront modifications applied by the second wavefront modulating element for the respective tiles of a second subset of the tiles are updated during the second time interval. Different tiles of the sample can be imaged for a fixed position of the LLS. Sizes of the tiles can be based on a spatial variation of an index of refraction of the sample over the tiles.

The fourth beam-forming optics can be configured for scanning a guide star over each tile to generate the light that is emitted from the sample through the detection objective in response to which the wavefront of light emitted from the sample and through the detection objective is determined.

The third beam-forming optics can be configured for scanning a guide star over each tile to generate the light that is emitted from the sample through the excitation objective in response to which the wavefront of light emitted from the sample and through the excitation objective is determined.

The microscope can further include a second light source, where the second light source is the source of both the second and third light beams.

In another general aspect microscope for imaging a sample includes a first light source for generating a first light beam having a wavelength, $\lambda_1$, first beam-forming optics configured for receiving the first light beam and generating a lattice light sheet (LLS) within the sample, the beam-forming optics including an excitation objective having an axis oriented in a first direction, and a detection objective configured for detecting signal light emitted from the sample in response to the LLS within the sample, the detection objective being oriented in a direction substantially perpendicular to the first direction. The microscope further includes a second light source for generating a second light beam having a wavelength, $\lambda_2$, second beam-forming optics configured for receiving the second light beam and imaging the second light beam onto a detection plane of the detection objective, a detector configured for detecting first light emitted from the sample in a direction parallel to the detection plane and though the excitation objective in response to the second light beam being imaged onto the detection plane and configured for detecting second light emitted from the sample in a direction parallel to the detection plane and though the excitation objective in response to the LLS being generated within the sample. The microscope further includes one or more processors configured for determining a displacement of the LLS from the detection plane along a direction perpendicular to the detection plane in response to the light emitted in response to the LLS and emitted in response to the second light beam being imaged onto the detection plane.

Implementations can include one or more of the following features, alone, or in any combination with each other.

For example, the detector can be configured to detect the first light emitted from the sample and the second light emitted from the sample simultaneously and the one or more processors can be configured to automatically focus the detection objective on the LLS in response to the determined displacement. The LLS has a thickness of less than about one micron.

The light emitted from the sample in a direction parallel to the detection plane in response to the second light beam being imaged onto the detection plane can have a wavelength of $\lambda_2/2$.

In another general aspect, a method for imaging a sample includes generating a first light beam, generating a lattice light sheet (LLS) within the sample, where the generating includes directing light from the first light beam through an excitation objective having an axis oriented in a first direction, and detecting signal light emitted from the sample in response to the LLS in the sample, where the detecting includes collecting the signal light through a detection objective oriented in a direction substantially perpendicular to the first direction. The method further includes imaging a second light beam through the excitation objective onto a focal plane of the excitation objective, and imaging a third light beam through the detection objective onto a focal plane of the detection objective. The method further includes determining a first wavefront of light emitted from the sample and through the excitation objective in response to the second light beam being imaged onto the focal plane of the excitation objective, determining a second wavefront of light emitted from the sample and through the detection objective in response to the third light beam being imaged onto the focal plane of the detection objective, modifying, based on the first determined wavefront, a wavefront of the first light beam from which the LLS is generated to reduce a sample-induced aberration of the LLS within the sample, and modifying, based on the second determined wavefront, a wavefront of the detected signal light to reduce a sample-induced aberration of the detected signal light.

Implementations can include one or more of the following features, alone, or in any combination with each other.

For example, the LLS can have a thickness of less than about one micron.

A wavelength of light emitted from the sample and through the excitation objective in response to the second light beam being imaged onto the focal plane of the excitation objective can be half the wavelength of the second light beam.

A wavelength of light emitted from the sample and through the detection objective in response to the third light beam being imaged onto the focal plane of the detection objective can be half the wavelength of the third light beam.

Modifying the wavefront of the first light beam from which the LLS is generated can include reflecting the first light beam off a spatial light modulator (SLM). The SLM can be conjugate to the sample. Generating the lattice light sheet (LLS) within the sample can include reflecting the first light beam off the SLM.

Modifying the wavefront of the detected signal light can include reflecting the detected signal light off a deformable mirror (DM).

Modifying the wavefront of the first light beam from which the LLS is generated can include applying discrete different wavefront modifications to the first light beam from which the LLS is generated when the LLS is located at different positions within the sample.

The sample can include guide star emitters that emit light having a different wavelength than the signal light.

The method can further include determining a displacement of the LLS from a focal plane of the detection objection along a direction perpendicular to the focal plane based on light emitted from the sample in response to the LLS and collected through the excitation objective and based on light emitted in response to the third light beam imaged onto the focal plane of the detection objective and collected through the excitation objective.

The method can further include adjusting, based on the determination of the displacement, a location of a plane of the LLS to within 400 nm of the focal plane of the detection objective.

The method can further include positioning the LLS at different positions within the sample to image different tiles of the sample, generating an image of the sample based on the different tile images, applying different wavefront modifications of the first light beam from which the LLS is generated for the different tiles, and applying different wavefront modifications of the emitted signal light for the different tiles.

The method can further include applying an initial wavefront modification to the first light beam from which the LLS is generated for a second tile adjacent to a first tile, where the initial wavefront modification is based on a wavefront modification applied to the first light beam for the first tile, applying an initial wavefront modification the emitted signal light for the second tile adjacent to the first tile, where the initial wavefront modification is based on a wavefront modification applied to the emitted signal light for the first tile.

The method can further include updating a wavefront modification applied to the first light beam from which the LLS is generated for a tile from a first modification at a first time to a second modification at a second time later than the first time, and updating a wavefront modification applied to the emitted signal light for the tile from a first modification at the first time to a second modification at a third time later than the first time.

The method can further include updating wavefront modifications applied to the first light beam from which the LLS is generated for respective tiles of a first subset of the tiles during a first time interval, where at least some of the tiles in the first subset being non-contiguous with another tile of the first subset, updating wavefront modifications applied to the first light beam from which the LLS is generated for respective tiles of a second subset of the tiles during a second time interval that occurs after the first time interval, at least some of the tiles in the second subset being non-contiguous with another tile of the second subset, updating wavefront modifications applied to the emitted signal light for the respective tiles of the first subset of the tiles during the first time interval, and updating wavefront modifications applied to the emitted signal light for the respective the second subset of the tiles during the second time interval.

Different tiles of the sample can be imaged for a fixed position of the LLS.

Sizes of the tiles can be based on a spatial variation of an index of refraction of the sample over the tiles.

The method can further include scanning a guide star over each tile to generate the light that is emitted from the sample through the detection objective in response to which the wavefront of light emitted from the sample and through the detection objective is determined.

The method can further include scanning a guide star over each tile to generate the light that is emitted from the sample through the excitation objective in response to which the wavefront of light emitted from the sample and through the excitation objective is determined.

The second light beam and the third light beam can be produced from the same light source.

Determining the first wavefront of light emitted from the sample and through the excitation objective in response to the second light beam being imaged onto the focal plane of the excitation objective can include imaging the light with a Shack-Hartmann wavefront sensor and weighting a determined modal structure of the first wavefront based on intensities of spots on the Shack-Hartmann wavefront sensor, and determining a second wavefront of light emitted from the sample and through the detection objective in response to the third light beam being imaged onto the focal plane of the detection objective can include imaging the light with a Shack-Hartmann wavefront sensor and weighting a determined modal structure of the second wavefront based on intensities of spots on the Shack-Hartmann wavefront sensor.

In another general aspect a method includes generating a first light beam having a wavelength, generating a lattice light sheet (LLS) within the sample from the first light beam, where the generating includes directing the first light beam through an excitation objective having an axis oriented in a first direction, detecting signal light emitted from the sample in response to the LLS within the sample, where the detecting includes collecting the signal light through a detection objective being oriented in a direction substantially perpendicular to the first direction, generating a second light beam having a wavelength, $\lambda_2$, imaging the second light beam onto a detection plane of the detection objective, detecting first light emitted from the sample in a direction parallel to the detection plane and though the excitation objective in response to the second light beam being imaged onto the detection plane, detecting second light emitted from the sample in a direction parallel to the detection plane and though the excitation objective in response to the LLS being generated within the sample, and determining a displacement of the LLS from the detection plane along a direction perpendicular to the detection plane in response to the light emitted in response to the LLS and emitted in response to the second light beam being imaged onto the detection plane.

Implementations can include one or more of the following features, alone, or in any combination with each other.

For example, the method can further include detecting the first light emitted from the sample and the second light emitted from the sample simultaneously, and automatically focusing the detection objective on the LLS in response to the determined displacement.

The LLS can have a thickness of less than about one micron.

The light emitted from the sample in a direction parallel to the detection plane in response to the second light beam being imaged onto the detection plane can have a wavelength of $\lambda_2/2$.

DETAILED DESCRIPTION

Figure 1:
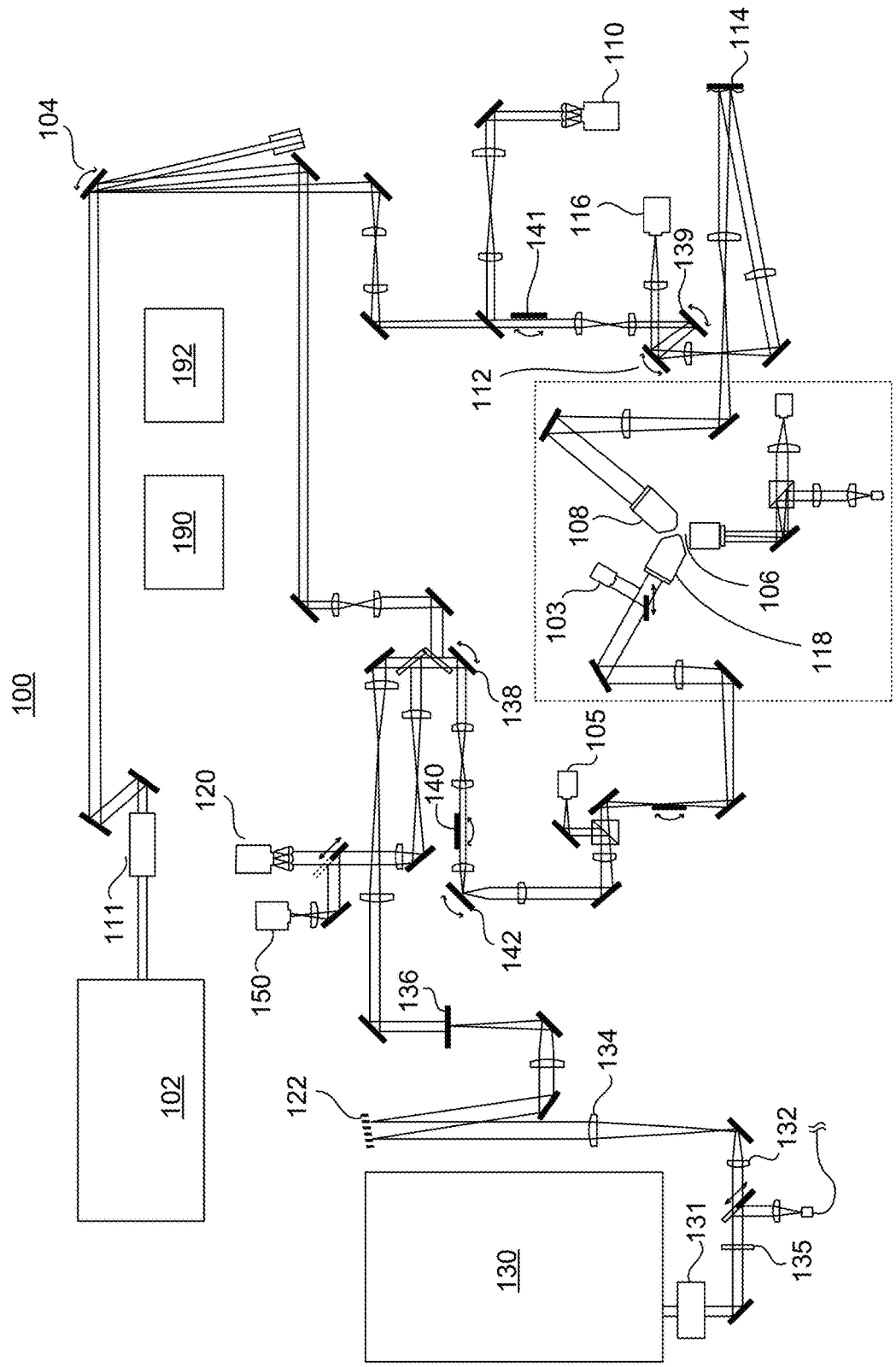
FIG. 1 is a schematic diagram of an adaptive optics lattice light sheet microscopy system.

A number of tools have been developed to address the problems of the existing art. New genome editing technologies, such as CRISPR/Cas9, enable expression of fluorescent fusion proteins at endogenous levels. Lattice light sheet microscopy (LLSM) provides a noninvasive alternative for volumetric imaging of whole living cells at high spatiotemporal resolution, often over hundreds of time points. LLSM is described, for example, in U.S. Patent Application Publication No. US20160305883A1, entitled, "NON-LINEAR STRUCTURED ILLUMINATION MICROSCOPY," which is incorporated herein by reference in its entirety. Adaptive optics (AO) corrects for sample-induced aberrations caused by the inhomogeneous refractive index of biological specimens to recover resolution and signal-to-background ratio comparable to that seen for isolated cultured cells, even for cells deeply buried within multicellular organisms. As described herein, combinations of these technologies can be used in novel ways that retain the benefits of each and thereby enable the in vivo study of cell biology in conditions as close as possible to the native physiological state. In particular, an adaptive optical lattice light sheet microscope (AO-LLSM) designed is disclosed, and its utility is demonstrated through high speed, high resolution in vivo imaging of dynamic subcellular processes in three dimensions (3D).

Lattice Light Sheet Microscope with Two-Channel Adaptive Optics.

As described herein, lattice light sheet microscopy is combined with two-channel adaptive optics (AO) to achieve, across large multicellular volumes, noninvasive aberration-free imaging of subcellular processes, including endocytosis, organelle remodeling during mitosis, and the migration of axons, immune cells, and metastatic cancer cells in vivo. The technology reveals the phenotypic diversity within cells across different organisms and developmental stages, and may offer insights into how cells harness their intrinsic variability to adapt to different physiological environments.

Several approaches to AO can be used when imaging biological systems, including in the excitation or detection light paths of a light sheet microscope. In one example approach, the sample-induced aberrations affecting the image of a localized reference "guide star," created via two-photon excited fluorescence (TPEF) within the specimen, can be measured and then corrected with a phase modulation element. By scanning the guide star over the region to be imaged, an average correction for the region can measured, which can be more accurate than single point AO correction for all points within the region, which is advantageous because a poor AO correction is often worse than none at all. Scanning the guide star over the region to obtain a single average correction for the region also greatly reduces the photon load demanded from any single point. Coupled with correction times as short as 70 ms, these advantages make this AO method compatible with the speed and noninvasiveness of LLSM.

In LLSM, light traverses different regions of the specimen for excitation and detection, and therefore is subject to different aberrations. Therefore, independent AO systems are needed for each or the excitation and detection pathways.

FIG. 1 is a schematic diagram of a microscopy LLSM system 100 that includes AO systems in the excitation and detection pathways. A laser 102 (e.g., a Ti:Sapphire ultrafast pulsed laser) can produce light that is ported to either the excitation or detection arm of a LLSM by a switching galvanometer 104. When the light is ported to the sample 106 through the detection arm, signal light (e.g., two-photon excitation fluorescence ("TPEF")) is generated within the sample 106 in response to the light from the laser 102 to form a "guide star" that can be scanned across the focal plane of the detection objective 108. The signal light can be descanned and sent to a wavefront detector 110 (e.g., a Shack-Hartmann wavefront sensor (DSH)) via a second switching galvanometer 112. Based on the wavefront detected by the wavefront detector 110, the inverse of the measured aberration can be applied to a deformable mirror 114 placed conjugate to both the wavefront detector 110 and the rear pupil plane of the detection objective 108. Because the signal generated by the lattice light sheet when used to image the sample travels the same path through the specimen as the guide star light, and reflects from the same deformable mirror 114, the corrective pattern that is applied to the deformable mirror 114 produces an AO corrected image of the current excitation plane within the specimen on the camera 116 when ported there by switching galvanometer 112.

Similarly, for adaptive optics correction of the LLS excitation light that provides excitation light to the sample, the galvanometer 104 can be positioned to direct light from the laser 102 through the excitation objective 118 and into the sample 106 to create a guide star that can be scanned through the sample. Signal light from the guide star (e.g., TPEF) can be collected through the excitation objective 118 and descanned to a second wavefront detector 120 that is used to measure a wavefront of the signal light from the guide star. However, because the LLS excitation light is confined to only a thin annulus at the rear pupil of excitation objective 118, a deformable mirror placed conjugate to this pupil may be ineffective for AO correction over most of its surface. Thus, in some implementations, a wavefront correction of aberrations along the excitation path of the LLS may be performed at the same sample-conjugate spatial light modulator (SLM) 122 that is used to create the light sheet itself, thereby enlisting thousands of independently corrective pixels. To do so, the measured phase aberration can be subtracted from the phase of the Fourier transform (FT) of the ideal, aberration-free SLM pattern, and then the result can be inverse transformed back to the sample-conjugate plane of the SLM 122.

In addition, resolution of an image of the sample obtained through LLS microscopy is optimized when the LLS is coincident with the focal plane of detection objective (e.g., to less than ~0.46 µm) over the entire field of view (FOV) of the detection objective 108. However, refractive index differences between the specimen and the surrounding media may lead to tip-tilt alignment or axial displacement errors for the light sheet that might cause the LLS not to line up with the focal plane of the detection objective 108. Fortunately, in many cases of interest only vertical displacement between the LLS and the focal plane of the detection objective (i.e., displacement in a directive perpendicular to the plane of the LLS and the focal plane of the detection objective) is a concern over FOVs typical of LLSM, and can be robustly corrected by imaging, edge-on through the excitation objective 118, the plane of TPEF that is generated when measuring the aberration in the detection pathway, and then measuring its offset relative to a plane of fluorescence generated by the LLS, also viewed edge-on through the excitation objective 118. In some implementations, the plane of TPEF that is generated when measuring the aberration in the detection pathway can be imaged simultaneously with a plane of fluorescence generated by the LLS that is also viewed edge-on through the excitation objective 118.

Tiled Acquisition for Aberrations Varying in Space and Time

Because the refractive index profile can vary across a specimen and can also vary as the specimen develops, the AO corrections required can vary in both space and time, and therefore different AO corrections to the LLS excitation light and to the detected signal light can be applied when imaging different portions of the specimen or when imaging the same portion of the specimen at different times. It can be difficult estimate a priori the size or temporal stability of an isoplanatic patch—the FOV over which a single AO correction is valid. Empirically, we have found in zebrafish embryos less than 72 fetal hemoglobin (hpf) that a single excitation/detection correction pair obtained by scan/descan over the FOV is usually valid across 30-60 µm in each direction for at least 1 hr, provided that the light does not intersect the yolk. Fortuitously, these dimensions are comparable to those over which a LLS of sub-micron thickness does not deviate substantially in width and therefore a single AO correction pair at a single time point could suffice for them.

In other cases, however, to cover larger FOVs, such as to study variability across a large population of cells, collective cell migration, or organogenesis data can be stitched together from multiple image subvolumes, each of which having its own independent AO correction. It has been observed that large aberrations in images of zebrafish embryos occur at regions of high curvature between the embryo and the surrounding media, or at regions of rapid refractive index change, such as near the notochord. For example, when the LLS penetrates the embryo nearly perpendicular to its surface, the excitation aberration is initially small. However, after the light sheet passes through the notochord, the light sheet can encounter substantial aberration. On the detection side, aberrations increase with increasing depth in the embryo. In addition, substantial aberrations can occur when the edge of the embryo is imaged tangentially, so that part of the detection light cone intersects the embryo and part does not.

Provided that the specimen does not shift more than a fraction of the isoplanatic patch size while imaging, a given set of tiled AO corrections can remain valid for hours. However, growth during development can cause an embryo to change its shape, position, or refractive index profile such that new corrections are occasionally needed. Fortunately, these changes often occur on a time scale slow compared to that needed to image even a large FOV by LLSM. In such cases, it can be sufficient to update the correction at only a subset of different tiles at each time point or time interval, as long as all subsets together encompass all tiles in the FOV before the previous round of corrections becomes inaccurate. For example, if a FOV includes 1000 tiles and an AO correction for the FOV needs to be updated every two hours, the FOV can be divided into an interleaved pattern of four subsets of 250 tiles, with the AO correction the first subset being updated every two hours, but the updating of different subsets being spaced in time by 30 minutes. Subsets that broadly cover the FOV can be chosen, in order to monitor where the aberrations change fastest.

3D Cell Migration In Vivo

By combining lattice light sheet microscopy with two independent channels of adaptive optical correction (i.e., of the light that creates the LLS and of the detected signal light), AO-LLSM enables minimally-invasive, high-speed 3D imaging of subcellular dynamics within optically challenging living specimens while still maintaining diffraction-limited resolution, even over large fields of view. Furthermore, it can correct not only sample induced aberrations, but also aberrations introduced by mounting/immersion media and other imperfections in the optical path through the microscope. It therefore can provide practical 3D resolution exceeding that of nominally higher numerical aperture (NA) confocal or spinning disk microscopes, even in the comparatively benign optical environment encountered when imaging isolated adherent cells on cover slips.

Because the fluorescence induced by the LLS is captured with widefield optics, AO-LLS is well suited for imaging weakly scattering specimens. Extremely sparse and/or weakly emitting fluorescent targets may benefit from co-labeling with a second, brighter color channel to provide sufficient guide star signal (~100 photons or more per cell of the Shack-Hartmann sensor) for accurate wavefront measurement. Highly absorbing structures such as large blood vessels or melanin bodies within the detection light cone can block guide star light from reaching enough cells of the wavefront sensor for accurate wavefront measurement, although robust wavefront reconstruction algorithms can be used when faced with such missing information. Even when measured accurately, wavefront aberration can vary considerably across the specimen, but in some implementations this variation can be determined empirically for each specimen type and developmental stage to determine how to subdivide the desired image volume into tiled isoplanatic subvolumes of relatively uniform aberration. Fortunately, such tile maps tend to be consistent between specimens of the same type and age, given similar mounting geometries.

Conventional light sheet microscopy using weakly focused Gaussian beams is also susceptible to aberrations, and therefore also can benefit from AO correction. However, conventional systems typically cover much wider fields of view and often operate at greater depth in larger organisms, such as in applications involving functional imaging of whole neural circuits or in toto cellular tracking during development. Therefore, they usually image over regions much larger than a single isoplanatic patch, making it difficult to retain even only cellular-level resolution at all locations, and compromising the accuracy and resolution of approaches based on multi-view fusion. A single AO correction would provide at best only partial correction, and a tiled AO approach, such described above for use with LLSM, would negate the high speed, large field advantages of the conventional light sheet microscopy. On the other hand, simultaneous full field AO correction would likely require multi-conjugate adaptive optics using several guide stars and wavefront modulation elements operating in concert, substantially increasing cost and complexity.

LLSM Subsystems

Still referring to FIG. 1, a light source and combiner 130 that can include one or more lasers can produce collinear laser beams that can expanded using a pair of cylindrical lenses 132, 134 and aligned such that different wavelengths can illuminate different vertically separated thin stripes on the spatial light modulator SLM 122 having, for example, 1920×1080 independent pixels. In some implementations, the light source and combiner 130 can house a plurality of lasers (e.g., having wavelengths of 405 nm, 445 nm, 488 nm, 560 nm, 589 nm, and 642 nm). The beam of each laser can be independently expanded to a $1/e^2$ diameter of 2.5 mm and aligned such that they are translated vertically with respect to each other. The beams then can be focused onto an acousto-optic tunable filter (AOTF) 131 and expanded using lenses 132, 134 to expand the beams along the x axis. Each elliptically expanded beam can illuminated a thin horizontal stripe on a greyscale spatial light modulator 122.

As a greyscale phase modulation device, SLM 122 can be used not only to create the LLS within the sample 106 but also to correct sample-induced aberrations of the LLS as well. The diffraction orders reflected from SLM 122 can be filtered using annular mask 136 (e.g., to physically block the zeroth order and any other unwanted diffraction orders) and conjugated to galvanometer scanning mirrors 138, 140 to scan the LLS along the x and the z axis within the sample. During imaging, different offset voltages can be applied to the z galvo 140 to sequentially realign the LLS generated from each laser of the light source and combiner 130 to the same plane within the specimen 106. The galvanometer scanning mirrors 138, 140 can be conjugated to one another with two more achromatic lenses, and the galvanometer scanning mirrors 138, 140 can scan the light sheet along the x and z axes in the sample. A sample plane conjugate resonant galvanometer 142 located prior to the excitation objective 118 can be used to wobble the LLS in the xy plane and thereby minimize stripe artifacts due to localized absorbing or scattering objects in the specimen 106. The annular mask 136 and the scanning galvos 138, 140 can be conjugated to the back focal plane of the excitation objective 118.

The fluorescence generated in the excitation plane of the LLS can be collected with the detection objective 108 and projected, using an achromatic lens pair, onto the deformable mirror 114 that is located conjugate to the rear focal plane of the detection objective 108, demagnified with another lens pair, and focused onto the detector 116 (e.g., a sCMOS camera).

Two inspection cameras 103, 105 conjugate to either the sample plane or the back focal plane of excitation objective 118 can be used to verify the optical alignment of the system. An epifluorescence objective 107 with a large field of view can be included to image the specimen 106 from below the sample chamber to locate regions of interest.

Adaptive Optics Subsystems

During measurement of aberrations in the excitation and detection optical pathways, light from light source 102 (e.g., a Ti:Sapphire ultrafast pulsed laser) can be ported to either the excitation arm or the detection arm by switching galvanometer 104. The light from the light source 102 can be passed through a Pockel cell 111 to control the intensity of TPFE at the focus of the objective 108 or 118. In either case, TPEF generated within the specimen by scanning light from the light source 102 and focusing the light by the excitation objective 118 or by the detection objective 108 was collected by the same respective objective, descanned, and sent to a respective wavefront sensor 120, 110 (e.g., a homebuilt Shack-Hartmann wavefront sensor), each including a microlens array focused onto an EMCCD camera. Based on the wavefronts measured by the wavefront sensors 120, 110, corrective wavefront patterns were then applied to SLM 122 to correct aberrations in the LLS and to the deformable mirror 114 to correct aberrations in the detected signal light.

For example, in the detection arm, the focused light from the light source 102 can be scanned across the focal plane of the detection objective 108 by a pair of scanning galvanometer mirrors 139, 141 conjugated to one another and also conjugated to the deformable mirror 114, which is conjugated to the rear pupil of detection objective, where it creates a scanning fluorescent guide star within the specimen 106.

On return, the guide star-induced fluorescence signal light was collected by detection objective 108, reflected off the deformable mirror 114, and directed by switching galvo 112 to galvos 139, 141, where it was descanned. The light then can be directed onto the Shack-Hartmann wavefront sensor 110 that can include a microlens array, an emission filter and an EMCCD camera.

Visualized wavefronts can be calculated from valid Shack-Hartmann spots using a zonal wavefront reconstruction in MATLAB. Invalid points in the Shack-Hartmann image can be recovered by smoothly interpolating using the neighboring points via the gridfit function in MATLAB. The waveforms then can be fitted (e.g., using a least-squares fit) with the first 55 Zernike modes. The tip, tilt, and defocus modes were set zero. Since the wavefront fit is unconstrained at the edges, the wavefront is mostly clearly plotted when just the inner 80% of the rear pupil diameter is shown. The wavefronts were rendered using Amira 6.3 at the tiled locations in the sample where the measurements and corrections took place.

Autofocus measurement was achieved by viewing on detector 150, side-on through the excitation objective 118, both the fluorescence due to excitation by the LLS and the plane of fluorescence generated by guide star TPFE through the detection objective 108, and correcting for any displacement between them. Based on the observed displacement, the focal plane of the detection objective 108 can be adjusted to coincide with the plane of the LLS.

The microscopy system 100 can include one or more processors 190 that execute computer readable code stored on one or more storage media 192 to control the system 100. For example, the one or more processors 190 can control synchronization of components of the system 100, such that the SLM 122 displays fixed patterns for generating an AO corrected LLS in the sample 106 and only updates the patterns when the AO correction of the LLS is changed between volume scans of the sample. The one or more processors can include a Field-Programmable Gate Array (FPGA) card that can serve as a master clock supplying camera triggers and control voltage waveforms during image acquisition.

Data acquired using the AO-LLSM system 100 can be corrected for intensity variation across the LLS, deconvolved using an experimentally measured point spread function (PSF) for each emission wavelength, and corrected for photobleaching. Multi-tile subvolumes can be stitched together using different stitching algorithms (e.g., a Grid/Collection Stitching plugin in Fiji or a Gradient-Domain stitching routine) to merge and smooth the boundaries between adjacent tiles by matching the low spatial frequency components of the adjacent tiles. The processed data sets can be visualized using known rendering software, for example, Amira (Thermo Fisher Scientific), Imaris x64 8.4 (Oxford Instruments), or Vision4D (Arivis) for 5D volumetric rendering.

Correction of Aberrations in the Detection Light Path
Calibration of Deformable Mirror To calibrate the deformable mirror 114, the phase pattern over the surface of the deformable mirror, $\Phi_{DMoff}(x', y')$, introduced by the deformable mirror 114 in its initial state when zero voltage applied to any elements of the mirror 114 can be directly measured (e.g., using a Michaelson interferometer). Then, the change from this phase pattern can be measured across the entire deformable mirror 114 when a voltage is applied to each of its 97 actuators, one by one. This yields a set of I=97 linearly independent impulse functions $\Phi_i(x', y')$ which serve as a basis set for decomposition of any arbitrary phase function of the light at the rear pupil of the detection objective 108. In particular, the pupil phase can be described by a sum over orthogonal Zernike polynomials $Z_n^m(x', y')$, m=−n, −n+2 . . . n−2, n, and each Zernike polynomial can be approximated by a linear combination of the measured impulse functions:

$$Z_n^m(x', y') = \sum_{i=1}^{97} a_{imn} \Phi_i(x', y') \quad (1)$$

In some implementations, the Zernike polynomials up through n=9 (a total of 55 polynomials) are sufficient to describe aberrations in real systems used on real samples. The coefficients $a_{imn}$ provide individual actuators voltages needed to generate any desired Zernike mode of any desired amplitude from the deformable mirror 114.

Determination and Correction of System Aberrations

With the deformable mirror 114 installed in the complete microscope system 100, a plurality of different 2D images of a non-aberrating reference object (e.g., a 100 nm diameter fluorescent bead on a cover slip) can be recorded at the detection path detector 116 as a plurality of respective different Zernike modes (e.g., flat phase, +/−defocus, +/−x astigmatism, and +/−y astigmatism) are applied, one after the other, to the deformable mirror 114. Phase retrieval based on the Gerchberg-Saxton algorithm then yields the aberration $\Phi_{sys}(x', y')$ introduced by the optical elements of the microscope itself. The inverse of this aberration then can be decomposed into Zernike modes:

$$-\Phi_{sys}(x', y') = \sum_{n=0}^{9} \sum_{m=-n}^{n} b_{mn} Z_n^m(x', y') \quad (2)$$

From Eqs. (1) and (2), the actuator voltages needed to cancel system aberrations then are given by:

$$V_i^{syscorr} = \sum_{n=0}^{9} \sum_{m=-n}^{n} a_{imn} b_{mn} \quad (3)$$

These voltages then can be applied to deformable mirror 114 to bring the detection path to diffraction-limited performance, so that all comparisons of performance before and after AO correction that follow thereafter refer to only sample-induced aberrations.

Calibration of Shack-Hartmann Wavefront Sensor

To calibrate the Shack-Hartmann wavefront sensor 110, pulsed light from light source 102 reflected from galvanometers 139, 141 as well as from the deformable mirror 114 and focused through the detection objective 108 can be used to excite a fluorescent dye solution in the imaging chamber, thereby creating a scanning guide star (GS). Light from the GS collected with detection objective 108 is then descanned by back reflection off galvos 139, 141 and sent to the input pupil of the Shack-Hartmann wavefront sensor 110, which is conjugate to deformable mirror 114 and the rear focal plane of detection objective 108. With deformable mirror 114 set for detection path system correction, the light from GS can create an array of, for example, J=12×12, focal spots on the camera of the wavefront sensor 110, where the locations of the focal spots serve as the reference positions for wavefront measurement. Thereafter, displacement $(x'_j, y'_j)$ of each spot from its reference position is proportional to the local slope of the wavefront, mapped back to the pupils of the detection objective 108 and deformable mirror 114, due to sample-induced aberrations and/or corrective patterns applied to deformable mirror 114.

To further calibrate the Shack-Hartmann wavefront sensor 110 within the assembled microscope, the spot displacements produced by an orthogonal basis set of corrective patterns at deformable mirror 114 can be measured. This permits accounting for small misalignments between deformable mirror 114 and Shack-Hartmann wavefront sensor 110 and the optics between them. To do so, a scanning GS can be generated and the spot positions $(x'_{jmn}, y'_{jmn})$ can be recorded as each of the Zernike modes from Eq (1) (e.g., through n=9) are applied in turn to the deformable mirror 114. In some implementations, it is possible to calibrate in terms of the spot displacements of the impulse functions $\Phi_i(x', y')$ rather than Zernike modes. However, using the intermediary of a Zernike expansion can be advantageous because: a) these modes have well defined physical meanings in terms of the aberrations to which they correspond (e.g., defocus, spherical aberration, astigmatism, etc.); and b) their measurement is influenced by spot displacements across the entire pupil, so they are less sensitive to a single bad displacement measurement than are the impulse functions, each of which is dominantly affected by at most a few such measurements.

Correction of Sample Induced Aberrations

For post-calibration aberration correction, a GS is first scanned over a plurality (e.g., five) xy planes (in the coordinate system of the detection objective 108) equally spaced axially within a presumed isoplanatic volume inside the specimen 106, while the resulting fluorescence signal is integrated at Shack-Hartmann wavefront sensor 110. The displacements ($x_{err'j}$, $y_{err'j}$) of the resulting spots on Shack-Hartmann wavefront sensor 110 represent the remaining wavefront error due to sample-induced aberrations $\Phi_{err}(x', y')$, averaged over the isoplanatic volume, which must be corrected to achieve diffraction-limited performance within the specimen. However, since $\Phi_{err}(x', y')$ can be expressed in terms of a Zernike expansion, $$\Phi_{err}(x', y') = \sum_{n=0}^{9}\sum_{m=-n}^{n} c_{mn} Z_n^m(x', y') \quad (4)$$

its displacements ($x_{err'j}$, $y_{err'j}$) can expressed in terms of an expansion of the measured displacements ($x'_{jmn}$, $y'_{jmn}$) of Zernike modes having the same coefficients:

$$(x_{err'j}, y_{err'j}) = \sum_{n=0}^{9}\sum_{m=-n}^{n} c_{mn}(x'_{jmn}, y'_{jmn}) \quad (5)$$

The coefficients $c_{mn}$ can be determined by a weighted 2D least squares fit, with the weighting being proportional to the intensity of each spot. Spots falling below a minimum intensity threshold can be assigned a weighting of zero. The weighting can ensure that displacements for which the highest confidence exists have the most influence in determining the modal structure of $\Phi_{err}(x', y')$, and that weak spots (such as those associated with marginal rays at the edge of the pupil that are more susceptible to scattering) or missing spots (such as those associated with rays that intersect absorptive bodies) do not introduce excessive error.

Finally, given $c_{mn}$, the voltages at deformable mirror 114 required to achieve diffraction-limited performance within the isoplanatic volume can determined by combining Eqs (1) and (4):

$$V_i^{AOcorr} = \sum_{n=0}^{9}\sum_{m=-n}^{n} a_{imn} c_{mn} \quad (6)$$

Correction of Aberrations in the Excitation Light Path

Calibration of Spatial Light Modulator

To calibrate the SLM 122 (e.g., an 8-bit, phase only spatial light modulator), the phase pattern introduced over the surface of the SLM phase, $\Phi_{SLM}(0, x, y)$, first can be directly measured when the grey level of all pixels of the SLM is set to zero. Then, for each excitation wavelength λ that is to be used for imaging, the change from this phase across SLM 122 as several different grey levels from 0 to 255 are applied can be measured, and then interpolated to find a relationship between any grey level (GL) and phase change $\Phi_{SLM}(GL, \lambda, x, y)$ that it yields across SLM 122. In general, this relationship is approximately constant across SLM 122:

$$\Phi_{SLM}(GL,\lambda,x,y) \approx \Phi_{SLM}(GL,\lambda) \quad (7)$$

and can be inverted to determine the grey level $GL(\Phi, \lambda)$ at any pixel for any desired phase change $\Phi$ at that pixel.

Determination and Correction of Systems Aberrations

Because the SLM 122 is conjugate to the sample plane and not to the rear pupil of the excitation objective 118, pupil-based phase retrieval as described above cannot be used to measure the aberration across the entire excitation path. Fortunately, for the lower NA value (~0.6) of the excitation objective 118, the dominant source of aberration in this path is the phase $\Phi_{SLM}^{err}(0, x, y)$ introduced by the deviation from flatness of the SLM 122 itself. Thus, if the SLM 122 is installed in the microscope in the same mount used during the measurement of $\Phi_{SLM}^{err}(0, x, y)$ above, so that its shape does not change, then system correction is achieved by applying:

$$GL_{syscorr}(\lambda,x,y)=GL(-\Phi_{SLM}^{err}(0,x,y),\lambda(y)) \quad (8)$$

across SLM 122. The wavelength λ is a function of the row position y on SLM 122 because the lattice light sheet pattern for each of the plurality of wavelengths used to image a sample is written on the SLM at all times, with each pattern vertically offset from the next.

Calibration of Shack-Hartmann Wavefront Sensor

Calibration of the excitation wavefront sensor 120 (e.g., Shack-Hartmann wavefront sensor) proceeds similarly to calibration of detection wavefront sensor 110. Light from the light source 102 is ported to the excitation optical path by galvanometer 107, reflected from galvanometers 138, 140 and focused through excitation objective 118 to excite a fluorescent dye solution in the imaging chamber, thereby creating a scanning guide star (GS). TPEF light from GS collected with excitation objective 118 is then descanned by back reflection off galvos 138, 140 and ported to the input pupil of the Shack-Hartmann wavefront sensor 120, which is conjugate to the rear focal plane of excitation objective 118. Shack-Hartmann wavefront sensor 120 can include an array of lenslets (e.g., a 10 mm×10 mm lenslet array of 0.5 mm pitch and 13.8 mm focal length) focused on a camera. The TPEF light from the GS creates an array of, for example, J=12×12, focal spots on the camera of the Shack-Hartmann wavefront sensor 120, whose locations serve as the reference positions for wavefront measurement. Thereafter, displacement ($x'_j$, $y'_j$) of each spot from its reference position is proportional to the local slope of the wavefront, mapped back to the pupils of the excitation objective 118, due to sample-induced aberrations.

Correction of Sample Induced Aberrations

For post-calibration aberration correction, GS is first scanned over an xy plane (in the coordinate system of excitation objective 118) axially centered within a presumed isoplanatic volume inside the specimen, and the displacements ($x_{err'j}$, $y_{err'j}$) of the resulting spots on the Shack-Hartmann wavefront sensor 120 are measured. These displacements represent the sample induced wavefront error $\Phi_{sample}(x', y')$ that must be corrected to achieve diffraction-limited performance within the specimen.

There are at least two differences between AO correction in the excitation arm and AO correction in the detection arm. First, because the SLM 122 is used for generation of the LLS in the sample 106 as well as for wavefront correction, the annular mask 136 must be in the beam path between the SLM 122 and the excitation objective 118 to filter out unwanted diffraction orders. However, the mask 136 cannot be in the beam path between the Shack-Hartmann wavefront sensor 120 and the excitation objective 118, or else all but a narrow annular ring of the wavefront from the GS would be blocked from reaching the Shack-Hartmann wavefront sensor 120. Thus, AO excitation path correction occurs in open loop mode, where the spot displacements at Shack-Hartmann wavefront sensor 120 are independent of the wavefront applied at the SLM. In contrast, AO detection path correction occurs in closed loop mode, where deformable mirror 114 is in the beam path between Shack-Hartmann wavefront sensor 110 and detection objective 108, and where the displacements at Shack-Hartmann wavefront sensor 110 represent a combination of the sample induced wavefront error and the current wavefront correction applied at deformable mirror 114.

A second difference is that, whereas the deformable mirror 114 is conjugate to the rear pupil of the detection objective 108, the SLM 122 is conjugate to the sample plane, because we can generate a more precise lattice light sheet with greater efficiency there. However, to use the same SLM 122 for AO correction in the excitation path (e.g., to save cost and reduce complexity), the corrective algorithm at the sample plane is more complex than simply applying the inverse of the measured wavefront error, as is done in the detection path. Instead, we start by considering the initial phase pattern at SLM required for system correction and lattice generation in the absence of sample-induced aberrations:

$$\Phi_{lattice}^{syscorr}(x,y,\lambda)=\Phi_{lattice}^{ideal}(x,y,\lambda)-\Phi_{SLM}^{err}(0,x,y) \quad (9)$$

If each lattice pattern is illuminated uniformly with its appropriate wavelength, this pattern produces an electric field at the SLM of:

$$E_{lattice}^{syscorr}(x,y,\lambda)=e_o(\lambda)\exp[i\Phi_{lattice}^{syscorr}(x,y,\lambda)] \quad (10)$$

Since the SLM 122 is conjugate to the sample plane of the excitation objective 118, and the annular mask 136 is conjugate to the rear focal plane of excitation objective 118, in the Fraunhofer approximation $E_{lattice}^{syscorr}(x, y, \lambda)$ produces a corresponding electric field at annular mask 136 given by its 2D Fourier transform:

$$E_{mask}^{syscorr}(x',y',\lambda)=F[E_{lattice}^{syscorr}(x,y,\lambda)] \quad (11)$$

where F is the Fourier transform operator, x, y refer to coordinates in planes conjugate to the sample plane, and x', y' refer to coordinates in planes conjugate to the rear pupil of excitation objective 118. After spatial filtering by the annular mask 136, this produces an electric field at the rear pupil plane of excitation objective 118 of:

$$E_{rear\_pupil}^{syscorr}(x',y',\lambda)=H(\rho_{max}-\rho)H(\rho-\rho_{min})F[E_{lattice}^{syscorr}(x,y,\lambda)] \quad (12)$$

where H(x) is the Heaviside step function (H(x)=0 for x<0, H(x)=1 for x>0), and $\rho_{max}$ and $\rho_{min}$ are the maximum and minimum radii of the annulus of the annular mask 136, respectively.

Given this electric field in the rear pupil necessary to create the system corrected lattice pattern, and given that the sample induced aberration $\Phi_{sample}(x', y')$ is measured by the Shack-Hartmann wavefront sensor 120 at a plane also conjugate to the rear pupil, the total electric field at the pupil required to create an aberration corrected lattice within the specimen is given by subtracting $\Phi_{sample}(x', y')$ from the phase of $E_{rear\_pupil}^{syscorr}(x', y', \lambda)$:

$$E_{rear\_pupil}^{total\_corr}(x',y',\lambda)=H(\rho_{max}-\rho)H(\rho-\rho_{min})F[E_{lattice}^{syscorr}(x,y,\lambda)]\exp[-i\Phi_{sample}(x',y')] \quad (13)$$

This can then be projected back to find the field at the SLM 120 required for complete correction by applying an inverse Fourier transform $F^{-1}$:

$$E_{SLM}^{total\_corr}(x,y,\lambda)=F^{-1}[E_{rear\_pupil}^{total\_corr}(x',y',\lambda)] \quad (14)$$

However, since the SLM 122 manipulates only phase and not amplitude, the pattern that is applied to the SLM 122 to create an AO corrected LLS within the specimen is given by the phase of $E_{SLM}^{total\_corr}(x, y, \lambda)$:

$$\Phi_{SLM}^{total\_corr}(x,y,\lambda)=\text{Arg}[E_{SLM}^{total\_corr}(x,y,\lambda)] \quad (15)$$

which, by the inversion of Eq (7), can be used to determine the grey level $GL_{SLM}^{total\_corr}(x, y, \lambda)$ required to generate the AO corrected lattice.

Figure 2E:
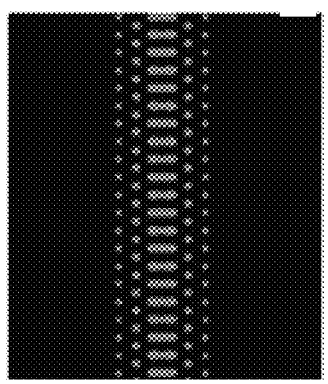
FIG. 2E illustrates an binary phase pattern on a spatial light modulator that could be used to generate an adaptive optics-corrected lattice light sheet in a sample in the presence of the aberrations of FIG. 2C.
Figure 2F:
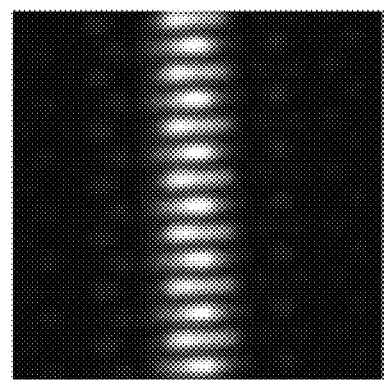
FIG. 2F illustrates an adaptive optics corrected light sheet pattern within a real, aberration-inducing sample.
Figure 2C:
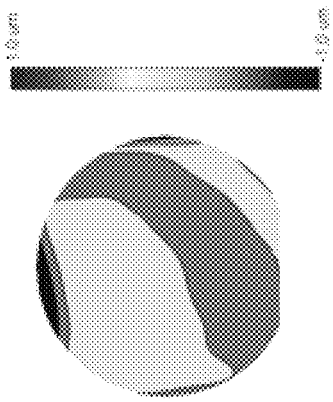
FIG. 2C illustrates a pattern of representative sample-induced aberrations over a field of view that can distort the lattice light sheet within the sample.
Figure 2D:
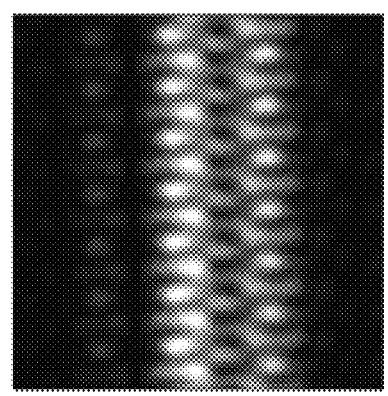
FIG. 2D illustrates a cross-section of the lattice light sheet that would result in the sample from the binary phase pattern shown in FIG. 2A, in the presence of the aberration pattern of FIG. 2C.
Figure 2A:
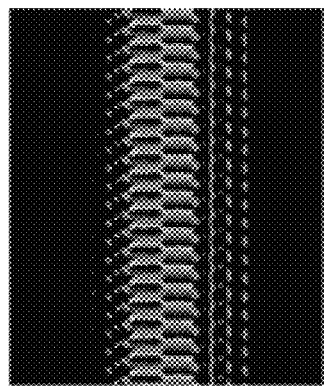
FIG. 2A illustrates an initial binary phase pattern on a spatial light modulator that could be used to generate an ideal lattice light sheet in an aberration-free setting.
Figure 2B:
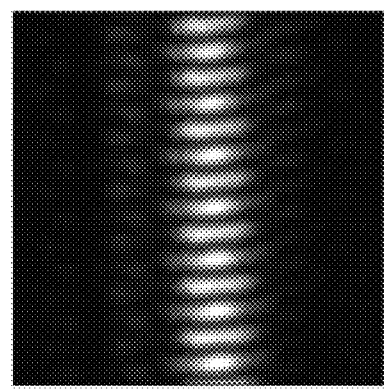
FIG. 2B illustrates the cross-section of the lattice light sheet that would result in a sample from the binary phase pattern shown in FIG. 2A, in the absence of any aberrations.

FIGS. 2A-2F are example images illustrating an AO correction of excitation light in the excitation arm to produce an AO corrected LLS within the sample. FIG. 2A illustrates an initial binary phase pattern at the SLM that would be used to generate an ideal lattice light sheet in an aberration-free setting. FIG. 2B illustrates the cross-section of the LLS that would result in the sample from the binary phase pattern shown in FIG. 2A, again in the absence of any aberrations. The LLS of FIG. 2B can be wobbled in its plane to produce a uniform time-averaged intensity sheet in the sample. FIG. 2C illustrates a pattern of representative sample-induced aberrations over a FOV that can distort the LLS within the sample. FIG. 2D illustrates the cross-section of the LLS that would result in the sample from the binary phase pattern shown in FIG. 2A, in the presence of the aberration pattern of FIG. 2C. The aberrations of FIG. 2C can be mitigated by applying an appropriate corrective greyscale pattern at the SLM, as shown in FIG. 2E, which results in the desired light sheet pattern within the real, aberration-inducing sample, as shown in FIG. 2F. When the light sheet patterns shown in FIGS. 2D and 2F are wobbled back-and-forth in their plane the intensity cross-section from the pattern of FIG. 2F is much narrower than that of FIG. 2D and is close to the cross-section that would result from the ideal pattern of FIG. 2B.

AO Correction and Autofocus Sequence

Excitation path AO correction, detection path AO correction, and autofocus of the detection objective onto the LLS plane can occur on a tile-by tile basis. For example, a first tile at a first time point can be AO corrected starting from system corrected patterns on the SLM 122 and the deformable mirror 114. However, subsequent tiles can be visited in a serpentine pattern. Therefore, for the first time point, we can start with the corrective patterns from the previous neighboring tile when measuring the corrections needed for the next tile. For all later time points, for any tile we can start with the corrective patterns we determined at the last time point for that tile and then measure the changes to these patterns needed for the current time point. Since AO correction of excitation path or detection path aberrations can shift the position of the light sheet or the detection focal plane, these corrections can be performed first at each tile before executing the autofocus sequence.

Figure 3:
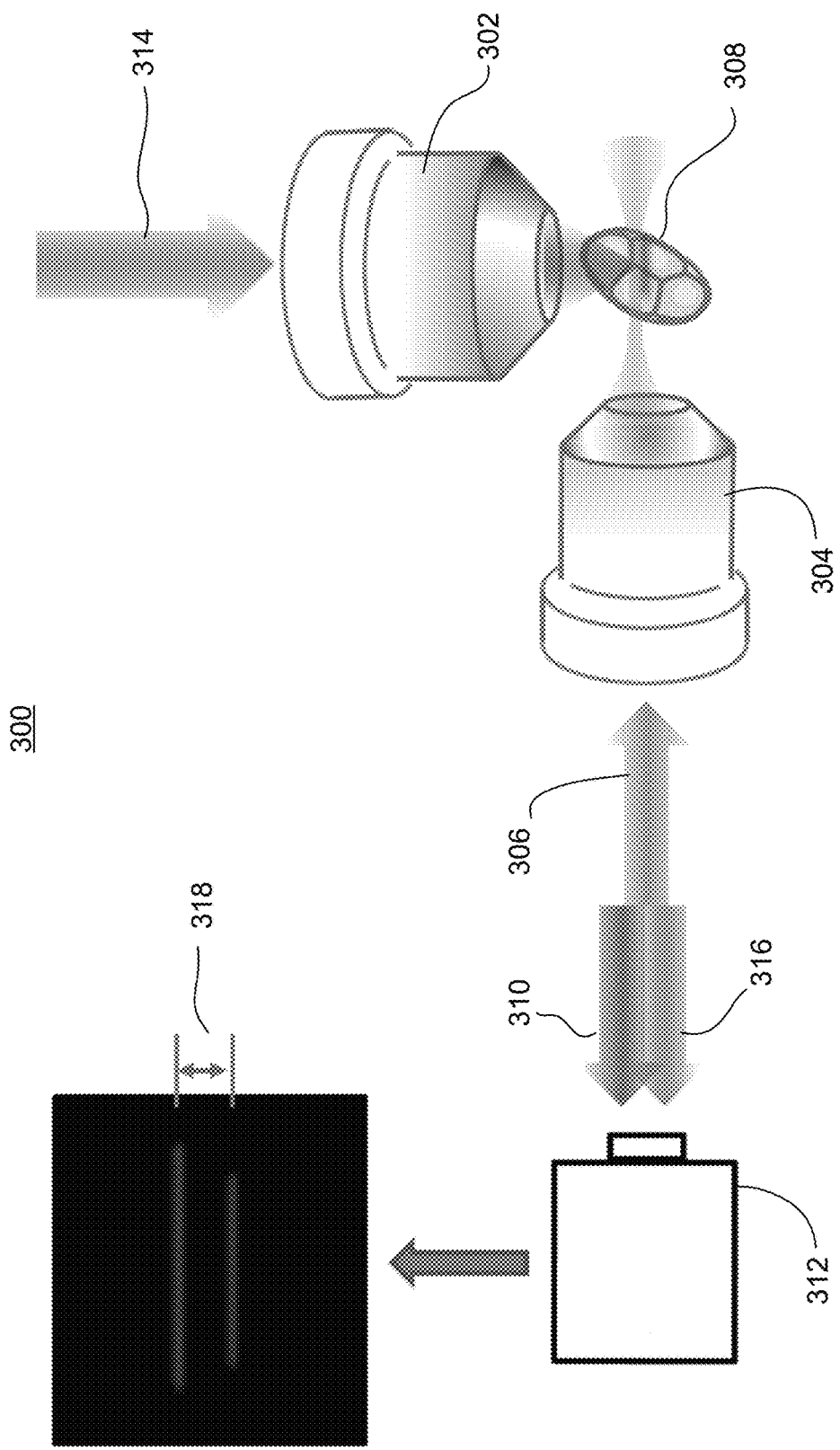
FIG. 3 is a schematic diagram of a system for autofocusing a focal plane of a detection objective to coincide with a lattice light sheet of excitation that is parallel to the focal plane of the detection objective and that is provided though an excitation objective.

FIG. 3 is a schematic diagram of a system 300 for autofocusing the focal plane of a detection objective 302 to coincide with a LLS plane of excitation light that is provided though an excitation objective 304. LLS excitation light 306 is provided through the excitation objective 304 to form a plane of LLS light in a sample 308. Fluorescence signal light 310 in response to the LLS in the sample is collected through the excitation objective 304 and imaged, edge-on, on a detector 312. In addition, two photon excitation (TPE) light 314 is scanned across a focal plane of the detection objective 302 and the resulting fluorescence signal light 316 in response to the TPE is also imaged on the detector 312. Then, an offset 318 between the two imaged signals determined a misalignment between the focal plane of the detection objective 302 and the plane of the LLS in the sample 308. In response to the determination, the focal plane of the detection objective and/or the position of the LLS plane in the sample in a direction normal to the plane are adjusted to automatically focus the focal plane of the detection objective to coincide with the LLS plane in the sample 308.

Referring again to FIG. 1, for the autofocus sequence itself, an initial calibration for axial chromatic aberration in the detection path can be performed, once the microscope is assembled and system aberration corrections are applied to the SLM 122 and the deformable mirror 114. Since the detection objective 108 is color corrected across the visible spectrum, the focal offset between different fluorescence emission wavelengths is small, but the offset between these visible wavelengths and the infrared two-photon excitation (TPE) wavelengths of light from light source 102 can be significant. Thus, for each TPE wavelength $\Delta_{TPE}$ used for AO correction, a reference object (e.g., a 100 nm fluorescent bead) that can be excited at that wavelength can be imaged, and the image can be used to record a 3D point spread function (PSF) by scanning the TPE spot laterally with galvos, and axially by translating detection objective 108 with a piezo. Then the axial centroid of the PSF can be calculated, and the piezo voltage $Vz_{TPE}(\lambda_{TPE})$ to which it corresponds can be determined. Next, the same bead can be illuminated with visible excitation light through excitation objective 118, and a 3D widefield PSF can be recorded by axially scanning the detection objective 108 piezo and imaging each plane at detector 150. Then, the axial centroid of this PSF can be calculated, and its corresponding piezo voltage $Vz_{VIS}$ can be determined. The difference:

$$\Delta Vz_{TPE}^{VIS}(\lambda_{TPE}) = Vz_{VIS} - Vz_{TPE}(\lambda_{TPE}) \tag{21}$$

gives the offset voltage needed to move the plane of the scanning TPE guide star to the focal plane of detection objective 108 at visible wavelengths.

After this initial calibration, one of two different paths was chosen to autofocus correction depending on whether the distribution of fluorescence within the current tile is sparse or dense. If it is sparse, so that it is likely that there is only a single bright feature within the current tile, the piezo of the detection objective 108 can be used to position the visible light focal plane of the detection objective 108 at the axial center of the tile and then sweep z galvo 140 to axially scan the light sheet through the tile while recording the fluorescence signal on detector 116 at every plane. After identifying the brightest plane, the position of galvo 140 can be fixed to position the LLS at this plane, and the voltage on the piezo of the detection objective 108 can be fixed such that its visible focal plane would be coincident with the light sheet plane if the sample were not present. Of course, with the sample present, the light sheet might be axially displaced, or the detection focal plane might be displaced by sample-induced defocus aberration. Therefore, to restore the coincidence of these planes, the fluorescence generated by the lattice light sheet can be collected back through excitation objective 118, and a side-on image of the light sheet at can be recorded at detector 150. Then, the light sheet excitation can be turned off, and the TPE excitation can be turned on and scanned across the TPE focal plane of detection objective 108 at the chosen excitation wavelength $\lambda_{TPE}$. The fluorescence generated from the TPE can be collected with excitation objective 118, and a side-on image of the TPE excitation plane can be recorded at detector 150. Then curves can be fit to the side-on profiles of the light sheet and TPE excitation plane to find their centers to sub-pixel precision. The axial distance $\Delta z_{LS}^{TPE}(\lambda_{TPE})$ between these planes determines the corrective voltage $\Delta Vz_{LS}^{TPE}(\lambda_{TPE})$ that must be applied to galvo 140 to bring the plane into alignment. However, to align the lattice light sheet with the visible focal plane, the calibration offset voltage $\Delta Vz_{TPE}^{VIS}(\lambda_{TPE})$ from Eq (21) is added to galvo 140 as well:

$$\Delta Vz_{LS}^{VIS}(\lambda_{TPE}) = \Delta \Delta Vz_{LS}^{TPE}(\lambda_{TPE}) + \Delta Vz_{TPE}^{VIS}(\lambda_{TPE}) \tag{22}$$

This then brings the lattice light sheet into alignment with the visible focal plane of detection objective 108, completing the autofocus procedure for the current tile.

If the fluorescence is densely distributed, this process can be repeated across a plurality of (e.g., five) planes $z=z_1 \ldots z_N$ equally spaced within the tile to determine the offset voltages $\Delta Vz_{LS}^{VIS}(\Delta_{TPE}, z_n)$ at galvo 140 required to keep the lattice light sheet at the visible focal plane of detection objective 108. Then a second order polynomial can be fit to this data, weighted by the peak TPE fluorescence signal recorded at detector 150 at each plane, to yield a continuous curve of the voltage offset vs axial position $\Delta Vz_{LS}^{VIS}(\lambda_{TPE}, z)$ required to maintain focus anywhere within the tile. In subsequent imaging, this offset curve is added to the linear voltage ramp normally applied to galvo 140 when scanning the light sheet axially through the tile.

Figure 4:
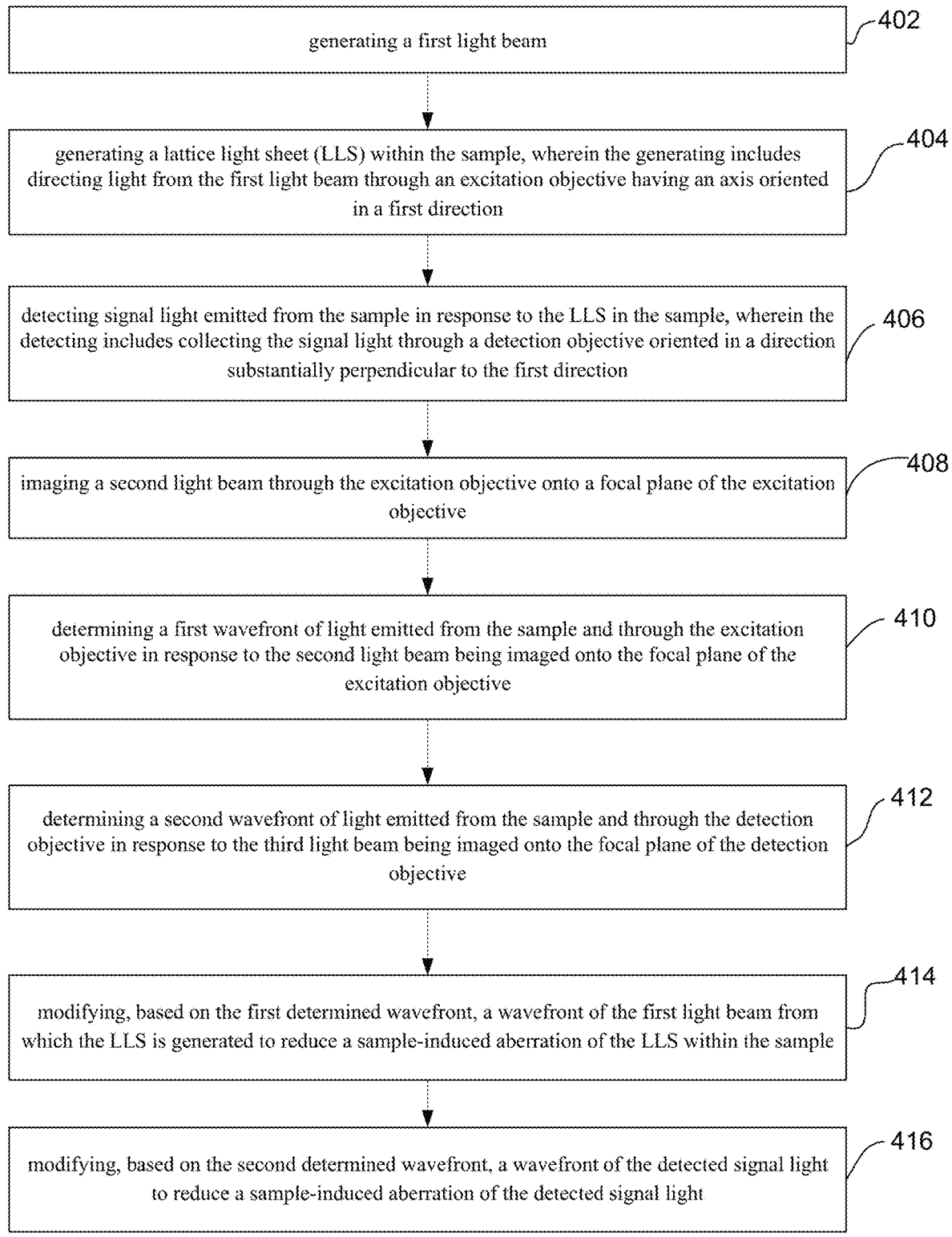
FIG. 4 is a flow chart of a process for imaging a sample.

FIG. 4 is a flow chart of a process 400 for imaging a sample. In the process 400, a first light beam is generated (402). A lattice light sheet (LLS) is generated within the sample, where the generating includes directing light from the first light beam through an excitation objective having an axis oriented in a first direction (404). Signal light emitted from the sample in response to the LLS in the sample is detected, where the detecting includes collecting the signal light through a detection objective oriented in a direction substantially perpendicular to the first direction (406). A second light beam is imaged through the excitation objective onto a focal plane of the excitation objective (408). A third light beam is imaged through the detection objective onto a focal plane of the detection objective (410). A first wavefront of light emitted from the sample and through the excitation objective in response to the second light beam being imaged onto the focal plane of the excitation objective is determined (412). A second wavefront of light emitted from the sample and through the detection objective in response to the third light beam being imaged onto the focal plane of the detection objective is determined (414). Based on the first determined wavefront, a wavefront of the first light beam from which the LLS is generated is modified to reduce a sample-induced aberration of the LLS within the sample. Based on the second determined wavefront, a wavefront of the detected signal light is modified to reduce a sample-induced aberration of the detected signal light (416).

Figure 5:
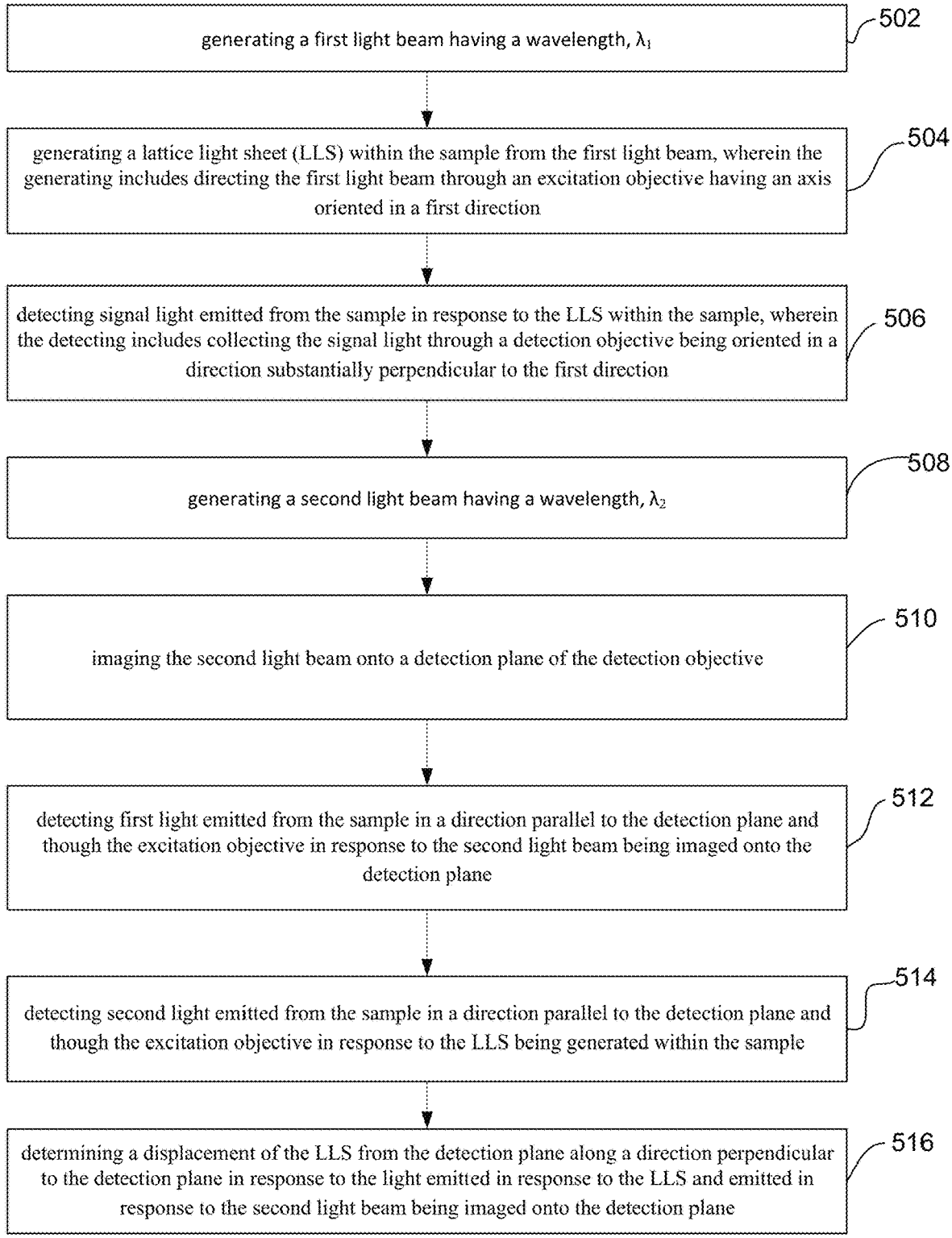
FIG. 5 is a flow chart of another process for imaging a sample.

FIG. 5 is a flow chart of a process 500 for imaging a sample. In the process 500, a first light beam having a wavelength, $\lambda_1$ is generated (502). A lattice light sheet (LLS) is generated within the sample from the first light beam, where the generating includes directing the first light beam through an excitation objective having an axis oriented in a first direction (504). Signal light emitted from the sample in response to the LLS within the sample is detected, where the detecting includes collecting the signal light through a detection objective being oriented in a direction substantially perpendicular to the first direction (506). A second light beam having a wavelength, $\lambda_2$ is generated (508). The second light beam is imaged onto a detection plane of the detection objective (510). First light emitted from the sample in a direction parallel to the detection plane and though the excitation objective is detected, where the first light is emitted in response to the second light beam being imaged onto the detection plane (512). Second light emitted from the sample in a direction parallel to the detection plane and though the excitation objective in response to the LLS being generated within the sample is detected (514). A displacement of the LLS from the detection plane along a direction perpendicular to the detection plane is determined in response to the light emitted in response to the LLS and emitted in response to the second light beam being imaged onto the detection plane.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, can be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items. The beam forming optics described herein can include, for example, lenses, mirrors, masks, filters, beam splitters, wavefront modulating elements, and the like.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A microscope for imaging a sample, the microscope comprising:
    a first light source for generating a first light beam;
    first beam-forming optics configured for receiving the first light beam and generating a lattice light sheet (LLS) within the sample, the beam-forming optics including an excitation objective having an axis oriented in a first direction, wherein the first beam-forming optics are configured for positioning the LLS at different positions within the sample to image different tiles of the sample;
    a detector configured for detecting signal light emitted from the sample in response to the LLS in the sample;
    second beam-forming optics including a detection objective oriented in a direction substantially perpendicular to the first direction and configured for collecting signal light emitted from the sample in response to the LLS within the sample and for imaging the collected light onto the detector;
    third beam-forming optics configured for receiving a second light beam and imaging the received second light beam onto a focal plane of the excitation objective;
    fourth beam-forming optics configured for receiving a third light beam and imaging the received third light beam onto a focal plane of the detection objective;
    one or more wavefront detectors configured for determining a wavefront of light emitted from the sample and through the excitation objective in response to the second light beam being imaged by the third beam-forming optics onto the focal plane of the excitation objective and configured for determining a wavefront of light emitted from the sample and through the detection objective in response to the third light beam being imaged by the fourth beam-forming optics onto the focal plane of the detection objective; and
    a processor for generating an image of the sample based on the different tile images,
    wherein the first beam-forming optics include a first wavefront modulating element configured for modifying a wavefront of the first light beam from which the LLS is generated to reduce a sample-induced aberration of the LLS within the sample, wherein first wavefront modulating element is configured for applying different wavefront modifications of the first light beam from which the LLS is generated for the different tiles and wherein a wavefront modification for a tile applied by the first wavefront modulating element is updated from a first modification at a first time to a second modification at a second time later than the first time and wherein wavefront modifications applied by the first wavefront modulating element for respective tiles of a first subset of the tiles are updated during a first time interval, at least some of the tiles in the first subset being non-contiguous with another tile of the first subset, and wherein wavefront modifications applied by the first wavefront modulating element for respective tiles of a second subset of the tiles are updated during a second time interval that occurs after the first time interval, at least some of the tiles in the second subset being non-contiguous with another tile of the second subset, and
    wherein the second beam-forming optics include a second wavefront modulating element configured for modifying a wavefront of the signal light emitted in response to the LLS in the sample to reduce a sample-induced aberration of the signal light at the detector, wherein second wavefront modulating element is configured for applying different wavefront modifications of the emitted signal light for the different tiles and wherein a wavefront modification for the tile applied by the second wavefront modulating element is updated from a first modification at the first time to a second modification at a third time later than the first time wherein wavefront modifications applied by the second wavefront modulating element for the respective tiles of the first subset of the tiles are updated during the first time interval, and wherein wavefront modifications applied by the second wavefront modulating element for the respective tiles of the second subset of the tiles are updated during the second time interval.

2. The microscope of claim 1, wherein the LLS has a thickness of less than about one micron.

3. The microscope of claim 1, wherein a wavelength of light emitted from the sample and through the excitation objective in response to the light beam being imaged by the third beam-forming optics onto the focal plane of the excitation objective is half the wavelength of the light beam imaged by the third beam-forming optics onto the focal plane of the excitation objective.

4. The microscope of claim 1, wherein a wavelength of light emitted from the sample and through the detection objective in response to the light beam being imaged by the fourth beam-forming optics onto the focal plane of the detection objective is half the wavelength of the light beam imaged by the fourth beam-forming optics onto the focal plane of the detection objective.

5. The microscope of claim 1, wherein the first wavefront modulating element includes a spatial light modulator (SLM).

6. The microscope of claim 5, wherein the SLM is conjugate to the sample.

7. The microscope of claim 5, wherein the first beam-forming optics include the SLM.

8. The microscope of claim 1, wherein the second wavefront modulating element includes a deformable mirror (DM).

9. The microscope of claim 1, wherein the first wavefront modulating element is configured for applying discrete different wavefront modifications to the first light beam from which the LLS is generated when the LLS is located at different positions within the sample.

10. The microscope of claim 1, wherein a distance between different positions of the LLS over which a wavefront modification to the first light beam remains constant before a different discrete wavefront modification is applied is determined based on a variation of a refractive index within the sample.

11. The microscope of claim 1, wherein the sample includes guide star emitters that emit light having a different wavelength than the signal light.

12. The microscope of claim 1, further comprising one or more processors configured for determining a displacement of the LLS from the focal plane of the detection objective along a direction perpendicular to the focal plane based on light emitted from the sample in response to the LLS and collected through the excitation objective and based on light emitted in response to the light beam imaged onto the focal plane of the detection objective by the fourth beam-forming optics and collected through the excitation objective.

13. The microscope of claim 12, wherein the first and second beam forming optics are configured for adjusting, based on the determination of the displacement, a location of a plane of the LLS to within 400 nm of the focal plane of the detection objective.

14. The microscope of claim 1,
wherein an initial wavefront modification applied by the first wavefront modulating element for a second tile adjacent to a first tile is based on a wavefront modification applied by the first wavefront modulating element to the first tile, and
wherein an initial wavefront modification applied by the second wavefront modulating element for the second tile adjacent to the first tile is based on a wavefront modification applied by the second wavefront modulating element to the first tile.

15. The microscope of claim 1, wherein different tiles of the sample are imaged for a fixed position of the LLS.

16. The microscope of claim 1, wherein sizes of the tiles are based on a spatial variation of an index of refraction of the sample over the tiles.

17. The microscope of claim 1, wherein the fourth beam-forming optics are configured for scanning a guide star over each tile to generate the light that is emitted from the sample through the detection objective in response to which the wavefront of light emitted from the sample and through the detection objective is determined.

18. The microscope of claim 1, wherein the third beam-forming optics are configured for scanning a guide star over each tile to generate the light that is emitted from the sample through the excitation objective in response to which the wavefront of light emitted from the sample and through the excitation objective is determined.

19. The microscope of claim 1, further comprising a second light source, wherein the second light source is the source of both the second and third light beams.

20. The microscope of claim 1, wherein tiles in the second subset are interleaved with tiles of the first subset.

21. A method for imaging a sample, the method comprising:
generating a first light beam;
generating a lattice light sheet (LLS) within the sample, wherein the generating includes directing light from the first light beam through an excitation objective having an axis oriented in a first direction;
positioning the LLS at different positions within the sample to image different tiles of the sample;
detecting signal light emitted from the different tiles of the sample in response to the LLS in the sample, wherein the detecting includes collecting the signal light through a detection objective oriented in a direction substantially perpendicular to the first direction;
imaging a second light beam through the excitation objective onto a focal plane of the excitation objective;
imaging a third light beam through the detection objective onto a focal plane of the detection objective;
determining a first wavefront of light emitted from the sample and through the excitation objective in response to the second light beam being imaged onto the focal plane of the excitation objective;
determining a second wavefront of light emitted from the sample and through the detection objective in response to the third light beam being imaged onto the focal plane of the detection objective;
generating an image of the sample based on the different tile images;
modifying, based on the first determined wavefront, a wavefront of the first light beam from which the LLS is generated to reduce a sample-induced aberration of the LLS within the sample, wherein the modifying includes applying different wavefront modifications of the first light beam from which the LLS is generated for the different tiles, updating a wavefront modification for a tile from a first modification at a first time to a second modification at a second time later than the first time, updating wavefront modifications for respective tiles of a first subset of the tiles during a first time interval, at least some of the tiles in the first subset being non-contiguous with another tile of the first subset, and updating wavefront modifications for respective tiles of a second subset of the tiles during a second time interval that occurs after the first time interval, at least some of the tiles in the second subset being non-contiguous with another tile of the second subset, and
modifying, based on the second determined wavefront, a wavefront of the detected signal light to reduce a sample-induced aberration of the detected signal light, wherein the modifying includes applying different wavefront modifications of the signal light emitted from different ones of the tiles, updating a wavefront modification signal light emitted from a tile from a first modification at a first time to a second modification at a third time later than the first time, wherein wavefront modifications applied to the signal light emitted from respective tiles of the first subset of the tiles are updated during the first time interval and wavefront modifications applied to signal light emitted from respective tiles of the second subset of the tiles are updated during the second time interval.

22. The method of claim 21, wherein the LLS has a thickness of less than about one micron.

23. The method of claim 21, wherein a wavelength of light emitted from the sample and through the excitation objective in response to the second light beam being imaged onto the focal plane of the excitation objective is half the wavelength of the second light beam.

24. The method of claim 21, wherein a wavelength of light emitted from the sample and through the detection objective in response to the third light beam being imaged onto the focal plane of the detection objective is half the wavelength of the third light beam.

25. The method of claim 21, wherein modifying the wavefront of the first light beam from which the LLS is generated includes reflecting the first light beam off a spatial light modulator (SLM).

26. The method of claim 25, wherein the SLM is conjugate to the sample.

27. The method of claim 25, wherein generating the lattice light sheet (LLS) within the sample includes reflecting the first light beam off the SLM.

28. The method of claim 21, wherein modifying the wavefront of the detected signal light includes reflecting the detected signal light off a deformable mirror (DM).

29. The method of claim 21, wherein modifying the wavefront of the first light beam from which the LLS is generated includes applying discrete different wavefront modifications to the first light beam from which the LLS is generated when the LLS is located at different positions within the sample.

30. The method of claim 21, wherein the sample includes guide star emitters that emit light having a different wavelength than the signal light.

31. The method of claim 21, further comprising determining a displacement of the LLS from the focal plane of the detection objective along a direction perpendicular to the focal plane based on light emitted from the sample in response to the LLS and collected through the excitation objective and based on light emitted in response to the third light beam imaged onto the focal plane of the detection objective and collected through the excitation objective.

32. The method of claim 31, further comprising adjusting, based on the determination of the displacement, a location of a plane of the LLS to within 400 nm of the focal plane of the detection objective.

33. The method of claim 21, further comprising:
applying an initial wavefront modification to the first light beam from which the LLS is generated for a second tile adjacent to a first tile, wherein the initial wavefront modification is based on a wavefront modification applied to the first light beam for the first tile; and
applying an initial wavefront modification the emitted signal light for the second tile adjacent to the first tile, wherein is the initial wavefront modification is based on a wavefront modification applied to the emitted signal light for the first tile.

34. The method of claim 21, wherein different tiles of the sample are imaged for a fixed position of the LLS.

35. The method of claim 21, wherein sizes of the tiles are based on a spatial variation of an index of refraction of the sample over the tiles.

36. The method of claim 21, further comprising scanning a guide star over each tile to generate the light that is emitted from the sample through the detection objective in response to which the wavefront of light emitted from the sample and through the detection objective is determined.

37. The method of claim 21, further comprising scanning a guide star over each tile to generate the light that is emitted from the sample through the excitation objective in response to which the wavefront of light emitted from the sample and through the excitation objective is determined.

38. The method of claim 21, wherein the second light beam and third light beam are produced from the same light source.

39. The method of claim 21, wherein:
determining the first wavefront of light emitted from the sample and through the excitation objective in response to the second light beam being imaged onto the focal plane of the excitation objective includes imaging the light with a Shack-Hartmann wavefront sensor and weighting a determined modal structure of the first wavefront based on intensities of spots on the Shack-Hartmann wavefront sensor; and
determining a second wavefront of light emitted from the sample and through the detection objective in response to the third light beam being imaged onto the focal plane of the detection objective includes imaging the light with a Shack-Hartmann wavefront sensor and weighting a determined modal structure of the second wavefront based on intensities of spots on the Shack-Hartmann wavefront sensor.

40. The method of claim 21, wherein tiles in the second subset are interleaved with tiles of the first subset.

* * * * *